(12) United States Patent
Sadakata et al.

(10) Patent No.: US 7,258,615 B2
(45) Date of Patent: Aug. 21, 2007

(54) ELASTIC SHAFT JOINT

(75) Inventors: Kiyoshi Sadakata, Gunma-ken (JP); Hiromichi Komori, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/332,260

(22) Filed: Jan. 17, 2006

(65) Prior Publication Data

US 2006/0116209 A1 Jun. 1, 2006

Related U.S. Application Data

(62) Division of application No. 10/136,363, filed on May 2, 2002, now abandoned.

(30) Foreign Application Priority Data

| May 16, 2001 | (JP) | ............................. 2001-146803 |
| Sep. 19, 2001 | (JP) | ............................. 2001-285516 |

(51) Int. Cl.
*F16D 3/76* (2006.01)

(52) U.S. Cl. ........................ 464/89; 403/225

(58) Field of Classification Search ................ 464/89, 464/134; 403/225–228
See application file for complete search history.

(56) References Cited

U.S. PATENT DOCUMENTS

| 1,839,094 | A | * | 12/1931 | Geyer | ..................... 403/228 X |
| 2,880,027 | A | * | 3/1959 | Everitt et al. | ............. 464/89 X |
| 3,137,148 | A | * | 6/1964 | Kayser | ......................... 464/89 |
| 3,320,771 | A | | 5/1967 | Roethlisberger et al. | ....... 64/27 |
| 3,501,928 | A | | 3/1970 | Pitner | ............................. 64/17 |
| 4,322,062 | A | * | 3/1982 | Aleck | ........................ 464/89 X |
| 4,376,254 | A | * | 3/1983 | Hellmann | |
| 4,406,640 | A | | 9/1983 | Franklin et al. | .............. 464/91 |
| 4,516,956 | A | | 5/1985 | Staiert | .......................... 464/89 |
| 4,655,728 | A | * | 4/1987 | Shimada | |
| 5,836,821 | A | | 11/1998 | Yamada et al. | ................ 464/89 |
| 5,916,026 | A | * | 6/1999 | Sadakata | ...................... 464/89 |
| 6,217,453 | B1 | | 4/2001 | Thompson | .................... 464/89 |

FOREIGN PATENT DOCUMENTS

| EP | 0 145 572 | | 6/1985 | | |
| FR | 2637334 | * | 4/1990 | ................... | 464/89 |
| GB | 857420 | | 12/1960 | | |
| GB | 897771 | | 5/1962 | | |
| GB | 2 322 687 | | 9/1998 | | |
| JP | 59-29147 | | 8/1984 | | |
| JP | 60-159418 | | 8/1985 | | |
| JP | 60-227016 | * | 11/1985 | ................... | 464/89 |
| JP | 4-69283 | | 6/1992 | | |
| JP | 6-329033 | | 11/1994 | | |
| JP | 08-170647 | | 7/1996 | | |
| JP | 8-200382 | | 8/1996 | | |
| JP | 9-229086 | | 9/1997 | | |
| JP | 10-19054 | | 1/1998 | | |
| JP | 2001-140918 | | 5/2001 | | |

* cited by examiner

*Primary Examiner*—Greg Binda
(74) *Attorney, Agent, or Firm*—Miles & Stockbridge P.C.

(57) ABSTRACT

An elastic shaft joint is constituted of a joint member, a shaft member being fitted in a shaft of the joint member, and an elastic bush having a cylindrical inner sleeve fitted and fixed on the joint member, a cylindrical elastic member fixed on an outside surface of the inner sleeve, and a cylindrical outer sleeve fixed on an outside surface of the elastic member, for elastic torque transmission between the joint member and the shaft member, wherein the outer sleeve is fixed on the shaft member.

2 Claims, 22 Drawing Sheets

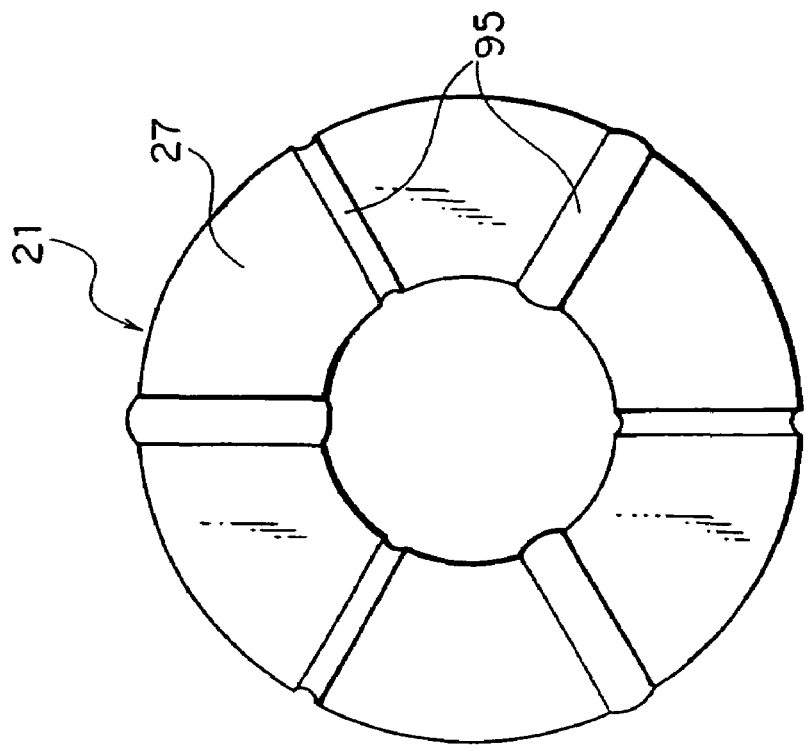
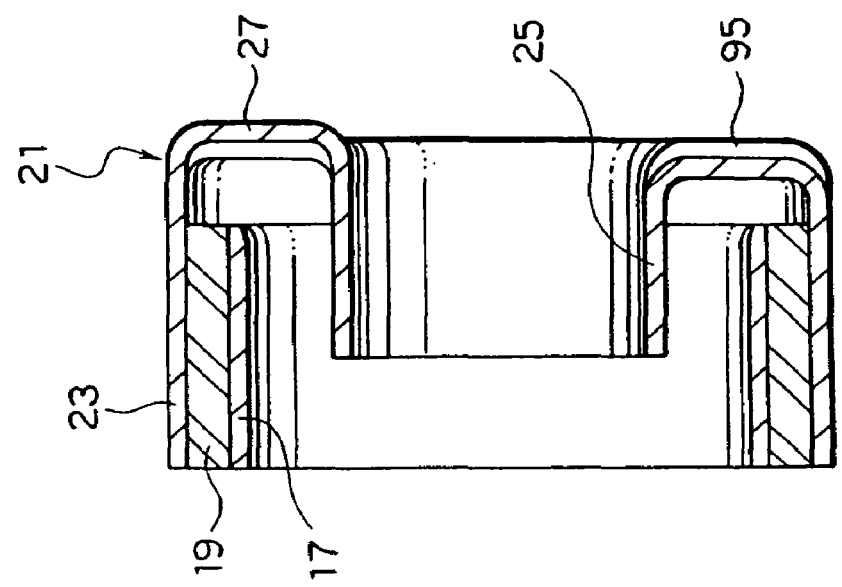

ELASTIC SHAFT JOINT

CROSS-REFERENCE TO RELATED APPLICATION

This application is a division of application Ser. No. 10/136,363, filed May 2, 2002, now abandoned.

This application also claims the benefit of Japanese Patent Applications No. 2001-146803 and No. 2001-285516 which are hereby incorporated by reference.

BACKGROUND OF THE INVENTION

1. Field of the Invention

The present invention relates to an elastic shaft joint used for a steering apparatus of an automobile and a method of forming an elastic bush thereof, and particularly to a technique for effectively absorbing displacement in the axial direction while securing comparatively high torsional rigidity.

2. Related Background Art

A steering apparatus of an automobile and the like generally comprises a steering wheel for a driver's steering, a steering gear for shifting the direction of dirigible wheels and a steering shaft for connecting the steering wheel and the steering gear. In such a steering apparatus, since the steering gear is rarely located on the axial center line of the steering wheel, a plurality of steering shafts connected by a universal joint are normally used. Such a universal joint for steering shafts is generally a Cardan joint in which a cross piece (joint cross) is movably mounted between a pair of joint elements, as disclosed in U.S. Pat. No. 3,501,928.

Recently, an elastic shaft joint with an elastic member of synthetic rubber or the like has been proposed in order to reduce transmission of kickback from the road surface to the steering wheel. In this type of elastic shaft joint, one joint element of a Cardan joint is separated into a joint member (yoke) and a shaft member (shaft), and an elastic ring of synthetic rubber, etc. is mounted between the yoke and the shaft. In order to prevent damage to the elastic ring and to enhance durability thereof, the yoke and the shaft are provided with stopper portions to limit more than a predetermined amount of relative rotation.

For example, Japanese Patent Application Laid-Open No. 6-329033 and Japanese Patent Application No. 11-324100 disclose an elastic shaft joint (first conventional device) wherein a comparatively shorter elastic bush is mounted between a yoke and a shaft. Also, Japanese Patent Application Laid-Open No. 9-229086 discloses an elastic shaft joint (second conventional device) wherein a pair of flat plate type elastic members is mounted between a yoke and a shaft. Further, Japanese Utility Model Application Laid-Open No. 4-69283 and Japanese Patent Application Laid-Open No. 8-200382 disclose an elastic shaft joint (third conventional device) wherein a comparatively longer elastic bush is mounted between a yoke and a shaft. Also, Japanese Utility Model Examined Publication No. 59-29147 and Japanese Patent Application Laid-Open No. 60-159418 disclose an elastic shaft joint (fourth conventional device) wherein two sets of elastic bushes are mounted separately away from each other between a cylindrical yoke and a cylindrical shaft. Furthermore, Japanese Patent Application Laid-Open No. 10-19054 discloses an elastic shaft joint (fifth conventional device) wherein an elastic member is disposed slidably in the axial direction in a corrugated cylindrical outer sleeve fitted on a yoke, and the outer sleeve is fixed to a shaft.

However, the above-mentioned elastic shaft joints have various properties and malfunctions caused by the properties. In the first conventional device, since only one shorter elastic bush is utilized, even though comparatively small force acts on the yoke and the shaft, the angle between the yoke and the shaft is easily changed, i.e., the yoke and the shaft are easily inclined to each other. Also, in the second conventional device, since the elastic members are not disposed circumferentially, the yoke and the shaft are easily inclined to each other in predetermined directions similarly to the first conventional device. Further, in the third conventional device, the longer elastic bush is utilized, so that the torsional rigidity can be kept comparatively high, but displacement of the yoke and the shaft becomes difficult in the axial direction. Further, in the fourth conventional device, the diameter of the elastic bushes is reduced. Therefore, when the strength of the elastic members is raised to secure the torsional rigidity, displacement of the yoke and the shaft becomes difficult in the axial direction. Furthermore, in the fifth conventional device, in order to slide the outer sleeve and the elastic member smoothly without looseness, high accuracy is required to form the outer sleeve and the elastic member. In addition, the yoke and the shaft are easily inclined similarly to the first and second conventional devices.

In the first, second and fifth conventional devices, due to easy inclination of the elastic shaft joint, when a driver turns a steering wheel from right to left, it is difficult to have torque transmitted to a steering gear, resulting in bad response of the steering system lacking in feeling of rigidity. In addition, excessive inclination of the elastic shaft joint causes large tensile and compressive deformation of the elastic member, leading to shortening of the lifetime of the device. Furthermore, in the third conventional device, preferable results can be obtained in respect to torsional rigidity and nonoccurrence of easy inclination. However, due to the difficult displacement in the axial direction, vibration from the steering gear is transmitted to the steering wheel and noise tends to be generated.

On the other hand, in the fifth conventional device, as the two sets of elastic bushes are provided away from each other in the axial direction, the inclination of the yoke and the shaft can be nearly neglected. However, the elastic bushes are disposed in the cylindrical yoke, so that when the diameter of the elastic bushes is increased, the weight of the device increases largely. On the other hand, when the diameter of the elastic bushes is kept small and a material with high strength is used for the elastic members, stability of response in steering is improved, but displacement in the axial direction is difficult, similar to the third conventional device.

SUMMARY OF THE INVENTION

It is an object of the present invention to provide an elastic shaft joint and an elastic bush forming method realizing effective absorption of displacement in the axial direction while securing comparatively high torsional rigidity.

In order to achieve the above objects, according to a first aspect of the present invention, an elastic shaft joint is constituted of a joint member; a shaft member being fitted in a shaft of the joint member; and an elastic bush having a cylindrical inner sleeve fitted and fixed on the joint member, a cylindrical elastic member fixed on an outside surface of the inner sleeve, and a cylindrical outer sleeve fixed on an outside surface of the elastic member, for elastic torque transmission between the joint member and the shaft member, wherein the outer sleeve is fixed on the shaft member.

In the first aspect of this invention, since the elastic bush is disposed on the outside surface side of the joint member, the diameter of the elastic member of the elastic bush becomes comparatively large, by which torsional rigidity of the elastic shaft joint is improved naturally.

According to a second aspect of the present invention, an elastic shaft member is constituted of a joint member; a shaft member being fitted in a shaft of the joint member; an elastic bush having a cylindrical inner sleeve fitted and fixed on the joint member, an elastic member fixed on an outside surface of the inner sleeve, and a cylindrical outer sleeve fixed on an outside surface of the elastic member, for elastic torque transmission between the joint member and the shaft member; and a torque transmitting member whose one end is fitted and fixed on the elastic bush and whose other end is fixed on the shaft member, wherein the elastic member is lopsidedly distributed largely on both end sides in the axial direction between the inner sleeve and the outer sleeve.

According to the second aspect of the present invention, since the elastic member is lopsidedly distributed largely on both end sides of the elastic bush in the axial direction, it is possible to reduce rigidity of the elastic shaft in the axial direction while making it difficult for the shaft to be inclined.

According to a third aspect of the present invention, an elastic shaft joint is constituted of a joint member; a shaft member being fitted in a shaft of the joint member; a plurality of elastic bushes each having a cylindrical inner sleeve fitted and fixed on the joint member, an elastic member fixed on an outside surface of the inner sleeve, and a cylindrical outer sleeve fixed on an outside surface of the elastic member, for elastic torque transmission between the joint member and the shaft member; and a torque transmitting member whose one end is fitted and fixed on the plurality of elastic bushes and whose other end is fixed on the shaft member, wherein the plurality of elastic bushes are disposed between the joint member and the torque transmitting member on both end sides in the axial direction.

In the third aspect of the present invention, since the plurality of the elastic members are disposed on both end sides of the torque transmitting member in the axial direction, it is possible to reduce rigidity of the elastic shaft joint in the axial direction while making it difficult for the shaft joint to be inclined.

Preferably, in the elastic shaft joint of the third aspect of the present invention, the plurality of elastic bushes constitute plural sets each of which has an elastic member with different rigidity, and the elastic members with high rigidity are disposed on both end sides in the axial direction between the joint member and the torque transmitting member.

In this case, since the rigidity of the elastic members are gradually increased toward both end sides in the axial direction, it is possible to reduce rigidity in the axial direction further with respect to the elastic shaft joint in the third aspect.

Preferably, in the elastic shaft joint in the first aspect of the present invention, after the inner sleeve, the elastic member and the outer sleeve are fixed to form the elastic bush, in order to subject the elastic member to compressive deformation, the diameter of the inner sleeve is increased or the diameter of the outer sleeve is decreased.

Thereby, since the elastic member is compressed beforehand, the fixing strength between the elastic member and both the sleeves is improved and also durability of the elastic member at the time of relative displacement of the inner sleeve and the outer sleeve in the rotational or axial direction is improved.

In the elastic shaft joint of the second or third aspect of the present invention, after the inner sleeve, the elastic member and the outer sleeve are fixed to form each elastic bush, in order to subject the elastic member to compressive deformation, the diameter of the inner sleeve is increased or the diameter of the outer sleeve is decreased.

Thereby, since the elastic member is compressed beforehand, the fixing strength between the elastic member and both the sleeves is improved and also durability of the elastic member at the time of relative displacement of the inner sleeve and the outer sleeve in the rotational or axial direction is improved.

In the elastic shaft joint of the second or third aspect of the present invention, a cross section of each elastic bush taken perpendicular to the axis of the elastic bush is formed in a noncircular shape so as to subject the elastic member to compressive deformation at the time of relative rotation of the inner sleeve and the outer sleeve.

Accordingly, at the time of relative rotation of the inner sleeve and the outer sleeve, the elastic member is subjected to compressive deformation, so that it is possible to improve torsional rigidity without increasing rigidity in the axial direction in vain.

According to a fourth aspect of the present invention, in a method of forming an elastic bush having a cylindrical inner sleeve, an elastic member fixed on an outside surface of the inner sleeve and a cylindrical outer sleeve fixed on an outside surface of the elastic member, after fixing the inner sleeve, the elastic member and the outer sleeve, in order to subject the elastic member to compressive deformation, the diameter of the inner sleeve is increased or the diameter of the outer sleeve is decreased.

Thereby, since the elastic member is compressed beforehand, the fixing strength between the elastic member and both the sleeves is improved and also durability of the elastic member at the time of relative displacement of the inner sleeve and the outer sleeve in the rotational or axial direction is improved.

BRIEF DESCRIPTION OF THE DRAWINGS

FIGS. 34A an 34B are, respectively, a vertical cross-sectional view and an elevation view of a housing according to a 19th embodiment;

DETAILED DESCRIPTION OF THE PREFERRED EMBODIMENTS

An elastic shaft joint according to the present invention will be described in accordance with several embodiments.

Figure 1:
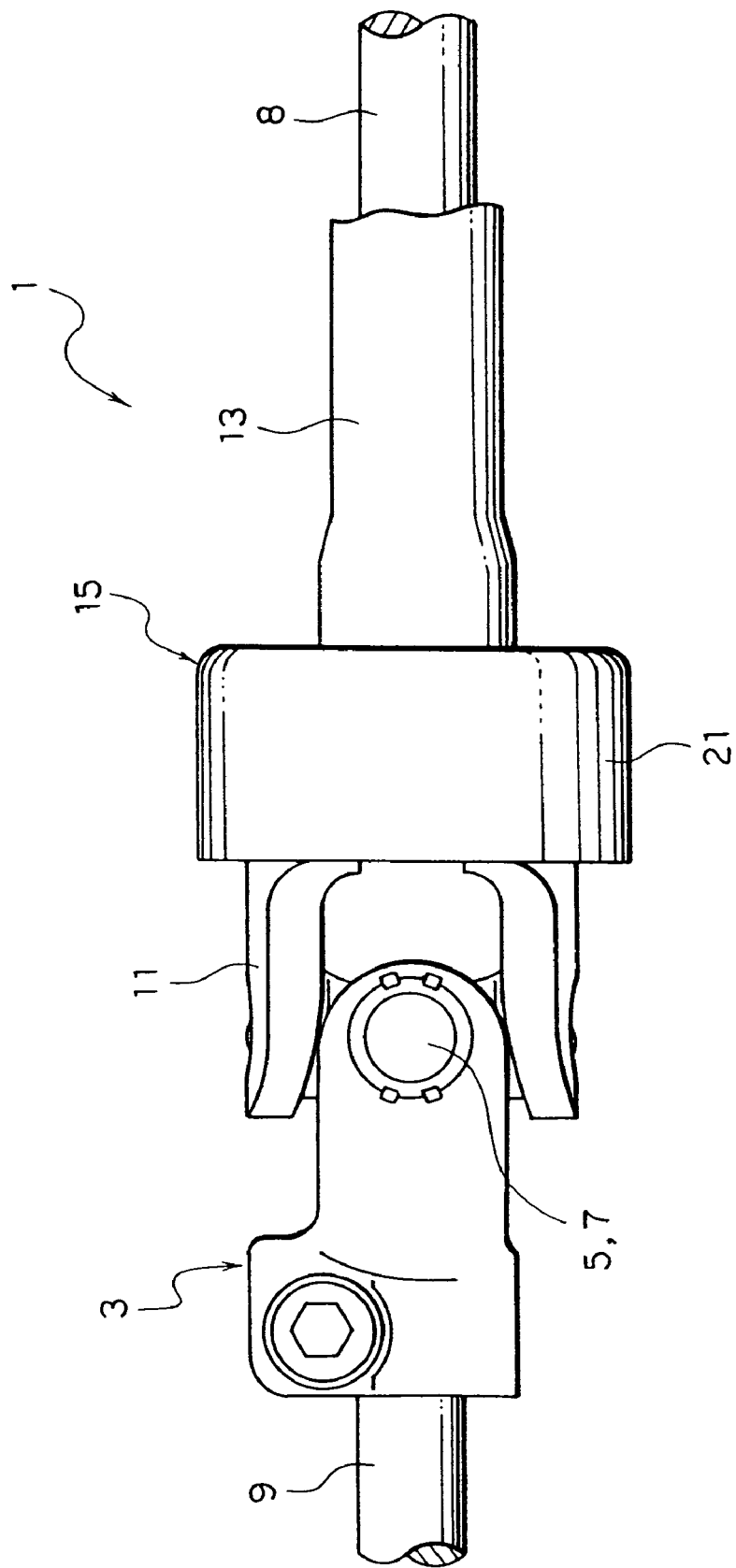
FIG. 1 is a side view of a Cardan joint according to a first embodiment.
Figure 2:
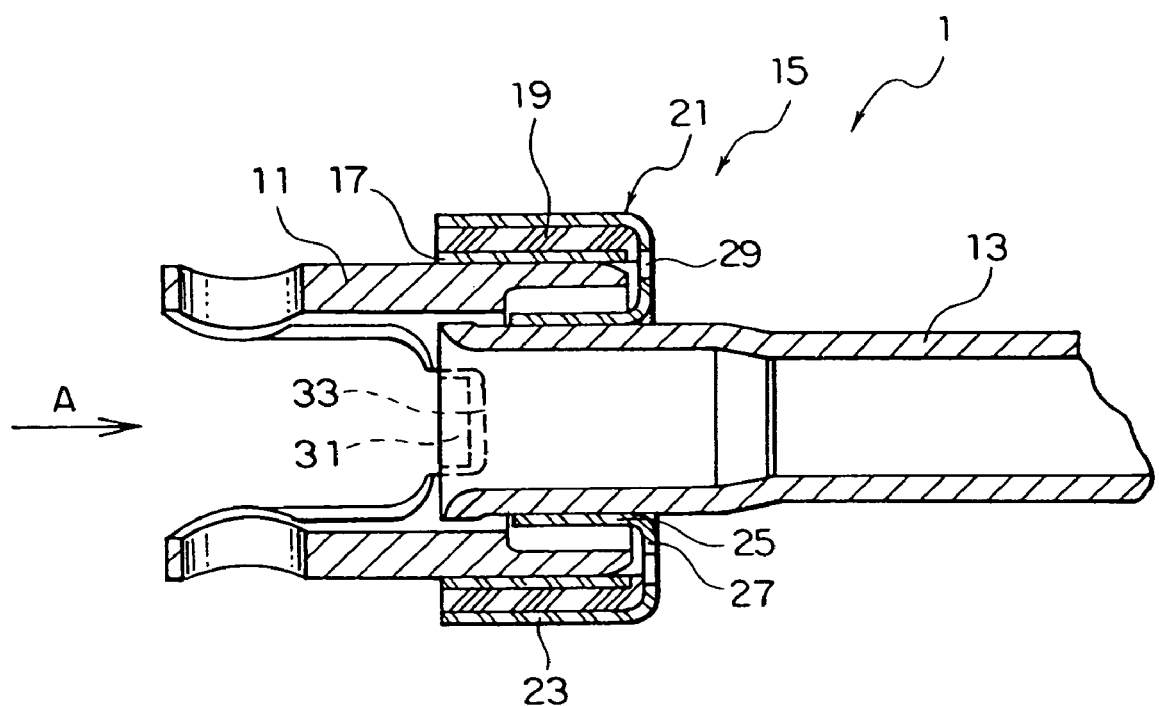
FIG. 2 is a vertical cross-sectional view of the yoke assembly according to a first embodiment.
Figure 3:
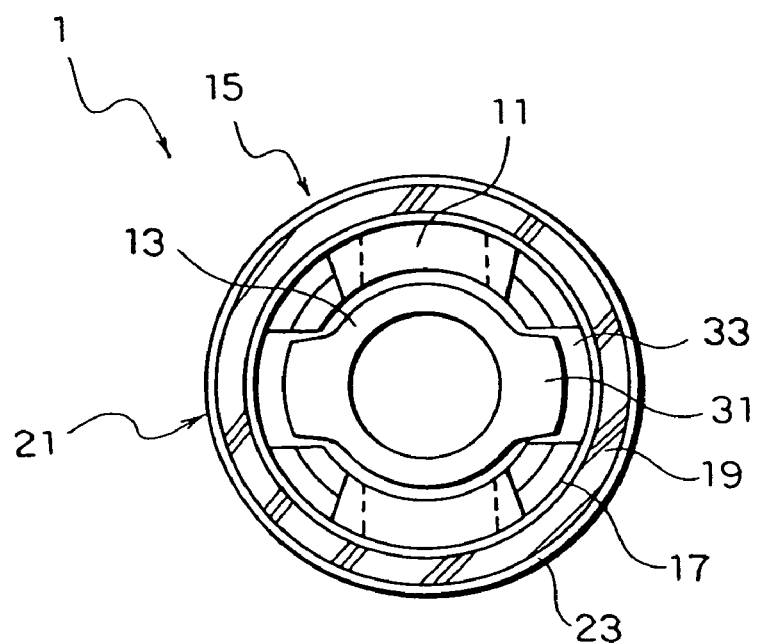
FIG. 3 is an elevation view seen along the arrow A in FIG. 2.

FIG. 1 is a side view of a Cardan joint incorporating an elastic shaft joint (yoke assembly) according to a first embodiment. FIG. 2 is a vertical cross-sectional view of the yoke assembly. FIG. 3 is a front elevation seen along the arrow A in FIG. 2. As shown in FIG. 1, the Cardan joint is constituted of a yoke assembly 1, a counterpart-yoke 3, a cross joint 5 and a bearing (needle roller bearing) 7, and connects a first steering shaft 8 and a second steering shaft 9 rockably. The second steering shaft 9 is fitted in the yoke 3 and fixed thereto with a bolt or the like. It is to be noted that in the description of FIG. 2, the left side of the drawing is made to be a tip side or a forward side.

The yoke assembly 1 has a joint member shown as yoke 11 of a forging made of carbon steel, etc. (or a drawn product made of hot-rolled sheet steel), a shaft 13 of a press-formed product, etc. made of low carbon steel pipe, etc. and an elastic bush 15 for transmitting elastic torque between the yoke 11 and the shaft 13. The elastic bush 15 has a cylindrical inner sleeve fitted and fixed on the back end side of the yoke 11 by means of press fit, a cylindrical elastic member 19 fixed integrally to the outside surface of the inner sleeve 17 by means of vulcanized joining with synthetic rubber as its material, and a housing 21 with an approximately U-shaped vertical cross section fixed integrally to the outside surface of the elastic member 19 by means of vulcanizing joining. The first steering shaft 8 is fitted in and engaged with the shaft 13 via serrations, etc. so as to be movable in the axial direction. As a result, the shaft 13 is rotated in accordance with rotation of the first steering shaft 8 and absorbs movement in the axial direction occurring due to the rotation.

The housing 21 is constituted of a cylindrical outer sleeve 23 having the elastic member 19 fitted therein, a cylindrical elastic torque transmitting ring 25 fitted and fixed on the tip side of the shaft 13 by means of press fit, and a disc-like web 27 connecting the outer sleeve 23 and the elastic torque transmitting ring 25. The reference number 29 in FIG. 2 indicates a hole formed in the web 27. When performing a press fit of the inner sleeve 17 to the yoke 11, a pressing jig is inserted through the hole 29. Besides, when performing press fit of the inner sleeve 17 to the yoke 11, the web 27 may be directly pressed, taking advantage of elastically deformable characteristics of the elastic bush 15 in the axial direction. The reference number 31 in FIGS. 2 and 3 indicates a stopper protrusion, and the reference number 33 indicates a recess, which is formed in the yoke 11 and in which the stopper protrusion is loose-fitted.

In the first embodiment, as the above structure is taken, the diameter of the elastic member 19 is made substantially larger as compared with conventional devices. As a result, while sufficient torsional rigidity between the yoke 11 and the shaft 13 is maintained, it is possible to effectively prevent inclination of the yoke assembly 1, which causes deterioration of response of the steering system. In addition, since components of the conventional device disclosed in the Japanese Patent Application Laid-Open No. 8-170647 can be utilized for the yoke 11 and the shaft 13, reduction of the component management and manufacturing cost can be realized. The transmission of large torque is carried out by the contact of the stopper protrusion 31 of the shaft 13 onto the inside surface of the recess 33 of the yoke 11.

Figure 4:
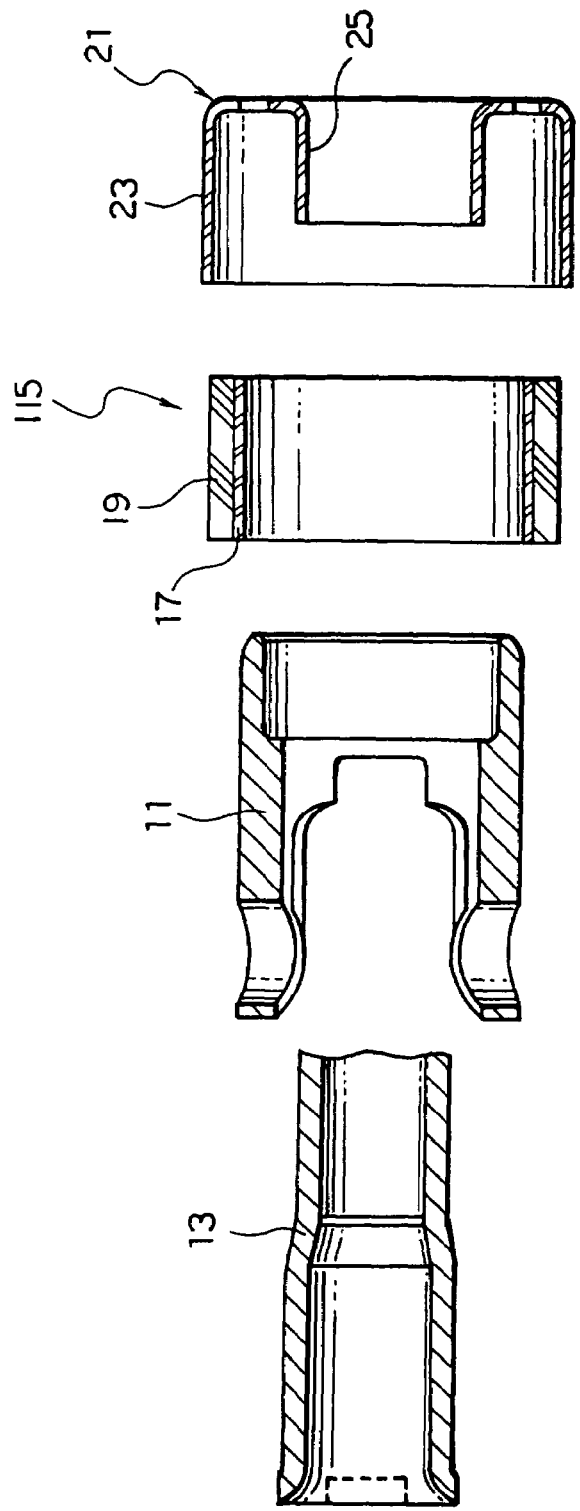
FIG. 4 is an exploded vertical cross-sectional view of a yoke assembly according to a second embodiment.

FIG. 4 is an exploded vertical cross-sectional view of a yoke assembly according to a second embodiment. The completed form and operation of the yoke assembly of the second embodiment are identical to those of the first embodiment, but the structure of the elastic bush 115 is different. That is, in the elastic bush 115 of this embodiment, the elastic member 19 is attached to the inner sleeve 17 by means of vulcanized joining, constituting one component separate from the housing 21. Therefore, in forming the yoke assembly 1, after the inner sleeve 17 is forced onto the yoke 11, the outer sleeve 23 of the housing 21 is forced and fixed to the elastic member 19, or after the elastic member 19 is forced and fixed to the outer sleeve 23, the inner sleeve 17 is forced upon the yoke 11. Besides, the elastic member 19 and the outer sleeve 23 may be fixed to each other via adhesive instead of press fit or may be fixed via both press fit and adhesive.

Figure 5:
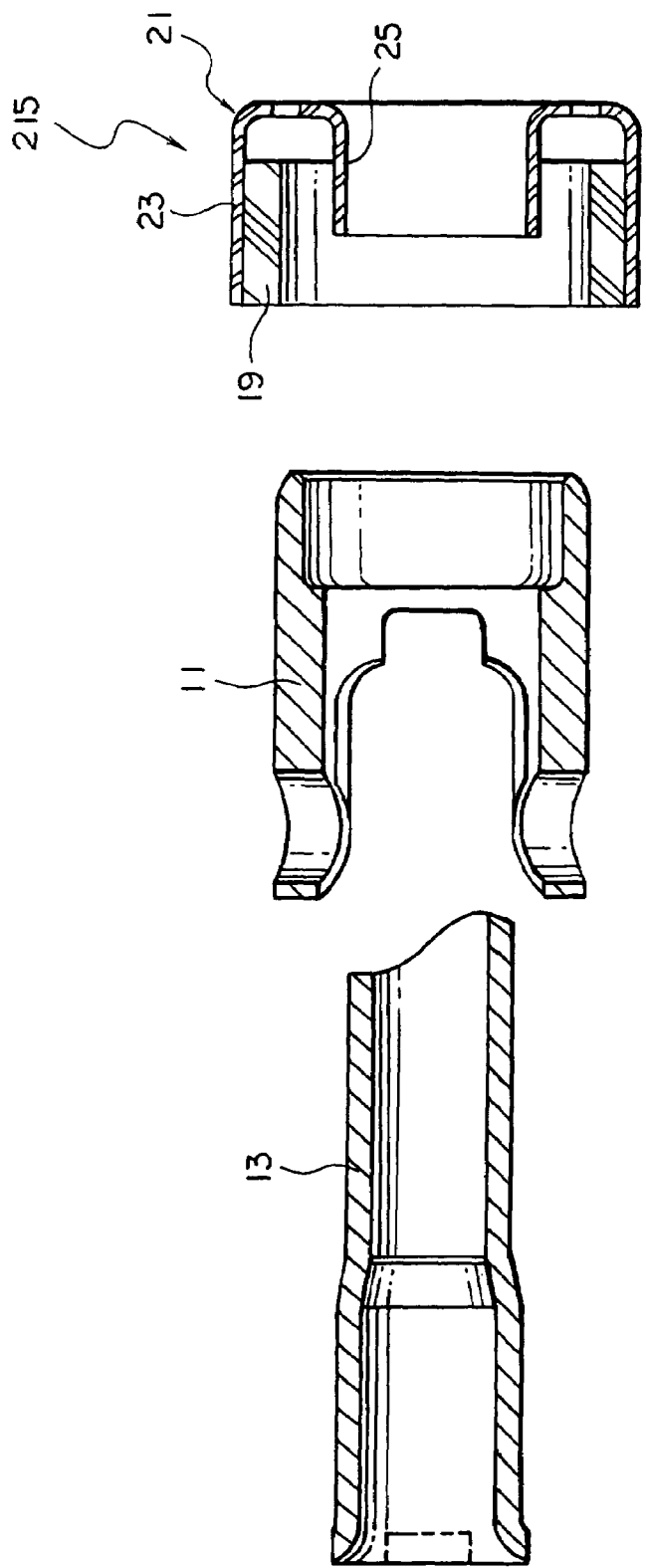
FIG. 5 is an exploded vertical cross-sectional view of a yoke assembly according to a third embodiment.

FIG. 5 is an exploded vertical cross-sectional view of a yoke assembly according to a third embodiment. The completed form and operation of the yoke assembly 1 of the third embodiment is approximately identical to those of the first embodiment, but the structure of the elastic bush 215 is different. That is, in the elastic bush 215 of this embodiment, the elastic member 19 and the outer sleeve 23 of the housing 21 are fixed to each other by means of vulcanized joining, and the inner sleeve is omitted. The elastic member 19 is forced directly upon the yoke 11. The elastic member 19 and the yoke 11 may be fixed to each other via adhesive instead of press fit, or may be fixed via both press fit and adhesive.

Figure 6:
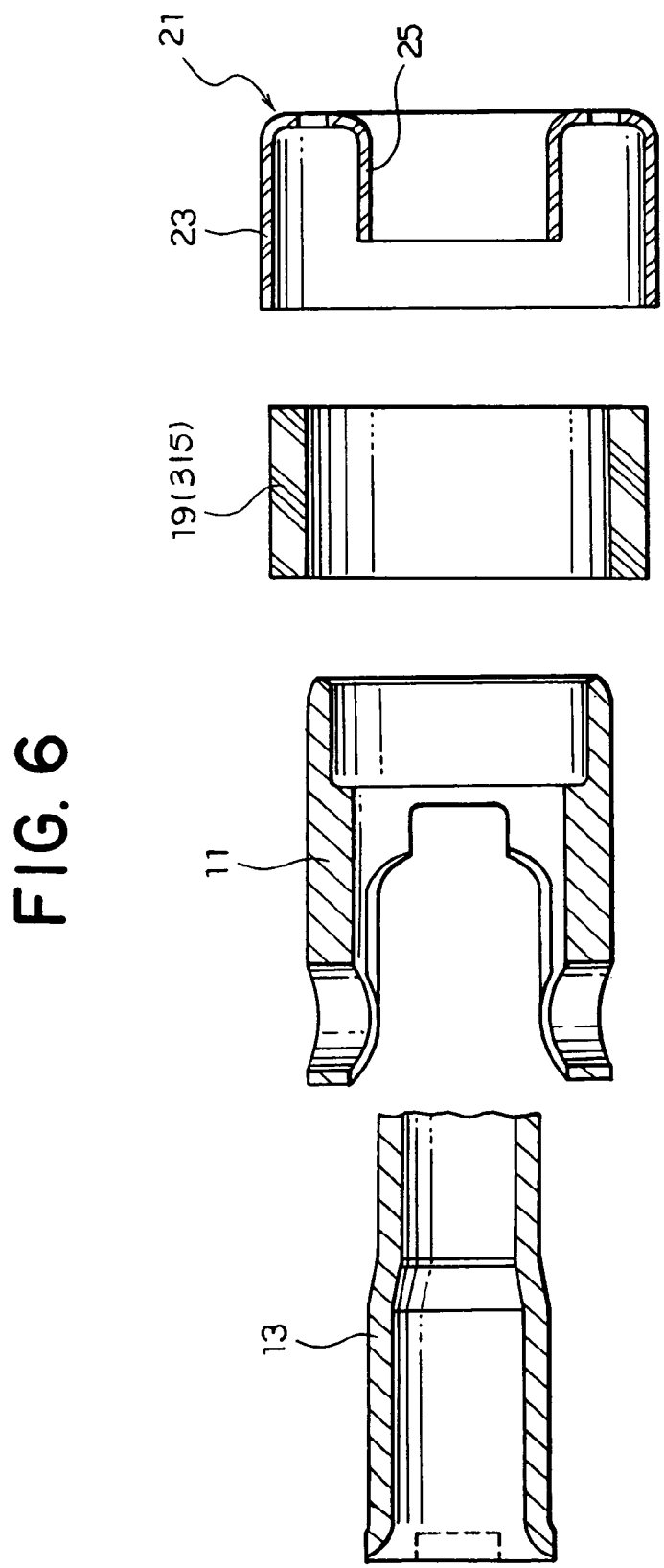
FIG. 6 is an exploded vertical cross-sectional view of a yoke assembly according to a fourth embodiment.

FIG. 6 is an exploded vertical cross-sectional view of a yoke assembly according to a fourth embodiment. The completed form and operation of the yoke assembly 1 of the fourth embodiment is approximately identical to those of the third embodiment, but the structure of the elastic member 15 is different. That is, the elastic bush 315 of this embodiment is the elastic member 19 itself, and the elastic member 19 is directly forced upon the yoke 11 and the outer sleeve 23 of the housing 21. Besides, the fixing of the elastic member 19 to the yoke 11 and the outer sleeve 23 may be performed via adhesive instead of press fit, or may be performed via both press fit and adhesive.

Figure 7:
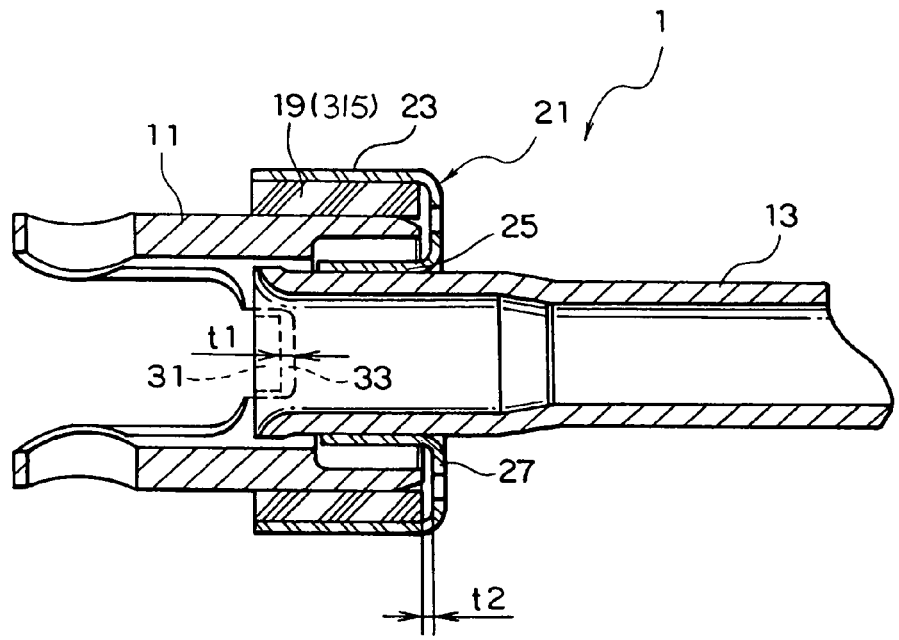
FIG. 7 is an explanatory view showing the operation of the fourth embodiment.

In the case of depending on only press fit fixing, when the yoke 11 and the shaft 13 are relatively shifted in the axial direction, the elastic member 19 might be slipped against the yoke 11 and the housing 21. In this case, as shown in the assembled state of FIG. 7, when the shaft 13 is moved by the distance t1 backward with respect to the yoke 11, the stopper protrusion 31 is brought into contact with the end surface of the recess 33 to be stopped, or when the housing 21 is moved forward by the distance t2 with respect to the yoke 11, the web 27 is brought into contact with the back end of the yoke 11 to be stopped, thereby preventing excessive slip of the elastic member 19. This operation is the same in the first and third embodiments when the elastic member 19 is forced upon the housing 21 and the yoke 11.

Figure 8:
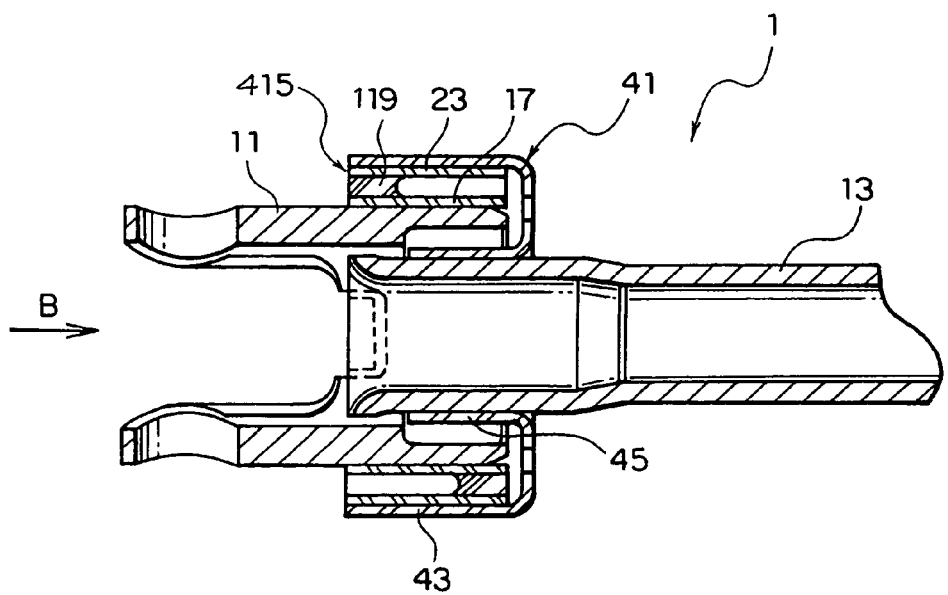
FIG. 8 is a vertical cross-sectional view according to a fifth embodiment.
Figure 9:
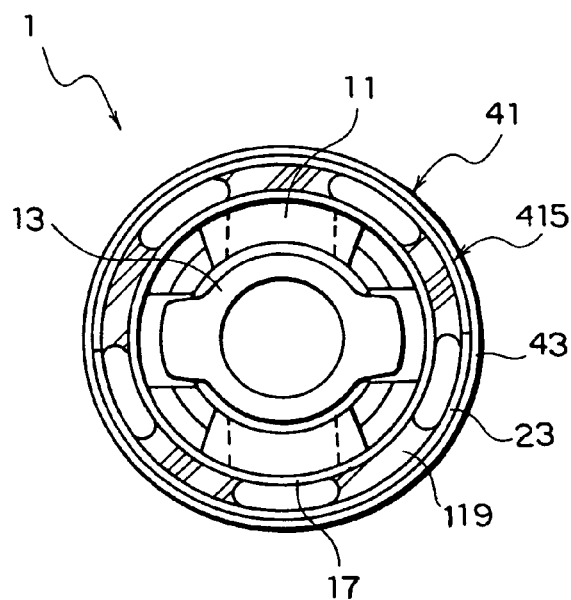
FIG. 9 is an elevation view seen along the arrow B in FIG. 8.
Figure 10:
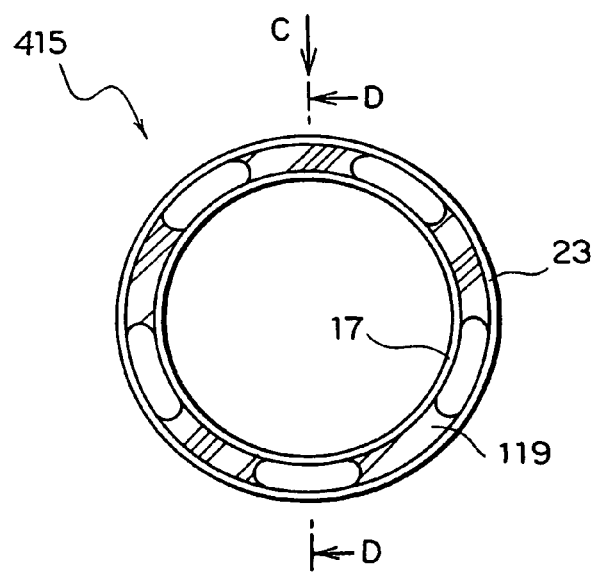
FIG. 10 is an elevation view of the elastic bush according to the fifth embodiment.
Figure 11:
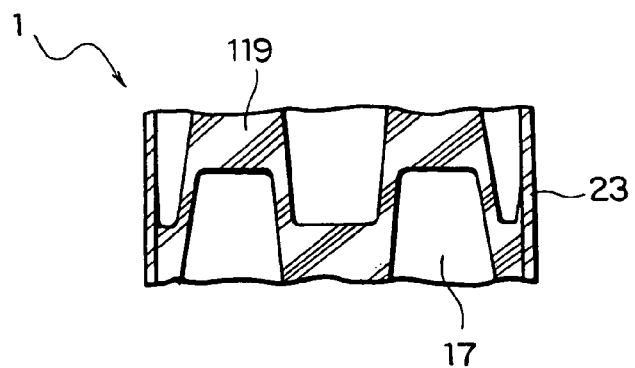
FIG. 11 is a view of the elastic bush of the fifth embodiment, as seen along arrow C in FIG. 10, with the outer sleeve taken in cross-section.
Figure 12:
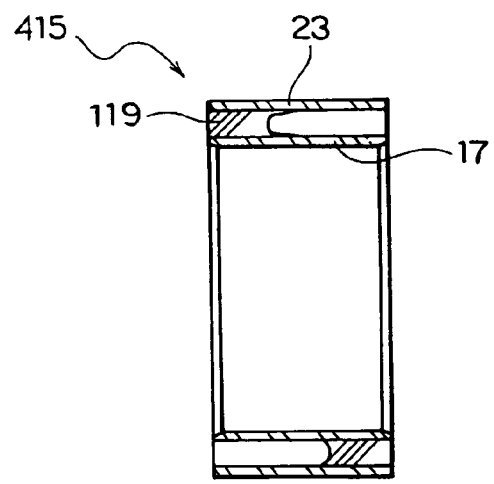
FIG. 12 is a cross-sectional view taken along line D-D in FIG. 10.

FIG. 8 is a vertical cross-sectional view of a yoke assembly according to a fifth embodiment. FIG. 9 is a front elevation seen along the arrow B in FIG. 8. FIG. 10 is a front elevation of the elastic bush. FIG. 11 is a view of the elastic bush, as seen along arrow C in FIG. 10, with the outer sleeve taken in cross-section. FIG. 12 is a cross-sectional view taken along line D-D. As shown in FIG. 8, in the yoke assembly of this embodiment, differently from the above embodiments, the elastic bush 415 is connected to the shaft 13 via a separate elastic torque transmitting member 41.

The elastic torque transmitting member 41 is approximately U-shaped in the vertical cross section. An outer ring 43 is fitted and fixed onto the outer sleeve 23 of the elastic bush 415, and an inner ring 45 is fitted and fixed onto the tip side of the shaft 13. Also, in the elastic bush 415 of this embodiment, as shown in FIGS. 10 to 12, the elastic member 119 is mounted between the cylindrical inner and outer sleeves 17 and 23. Elastic member 119 is formed cylindrically and integrally, but is zigzag-shaped to have large areas on both end portions in the axial direction.

In the fifth embodiment, since the above structure is taken, the diameter of the elastic member 119 is increased similarly to the first embodiment, and the elastic member 119 is lopsidedly distributed so as to be large on the both end portions in the axial direction. As a result, while sufficient torsional rigidity between the yoke 11 and the shaft 13 is maintained, it is possible to effectively prevent inclination of the yoke assembly 1 which causes deterioration of response in the steering system, and to reduce rigidity of the yoke assembly 1 in the axial direction which causes vibration and noise.

Figure 13:
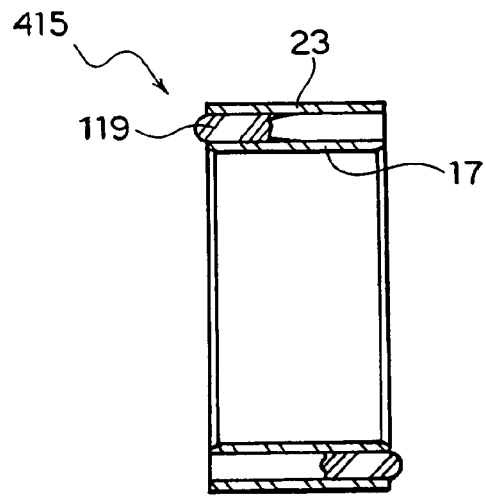
FIG. 13 is a vertical cross-sectional view of an elastic bush of a modification of the fifth embodiment.

FIG. 13 shows a modification of the fifth embodiment, corresponding to FIG. 12. In the modification, after the elastic member 119 is fixed to the inner sleeve 17 and the outer sleeve 23 by means of vulcanized joining, the diameter of the inner sleeve 17 is increased or the diameter of the outer sleeve 23 is decreased. As shown in the drawing, the compressed elastic member 119 is swelled out between the inner sleeve 17 and the outer sleeve 23. In this modification, thus the elastic member 119 is compressed beforehand, so that wave-like flex deformation occurs in polymers forming the elastic member 119. Thereby, when the inner sleeve 17 and the outer sleeve 23 are relatively displaced in the rotational direction or axial direction, the deformed polymers are extended to be almost the original form. Consequently, scission of the polymers causing fatigue failure of the elastic member 119 is less likely to occur, leading to enhancement of durability of the elastic member 119 (i.e. the elastic bush 415).

Figure 14:
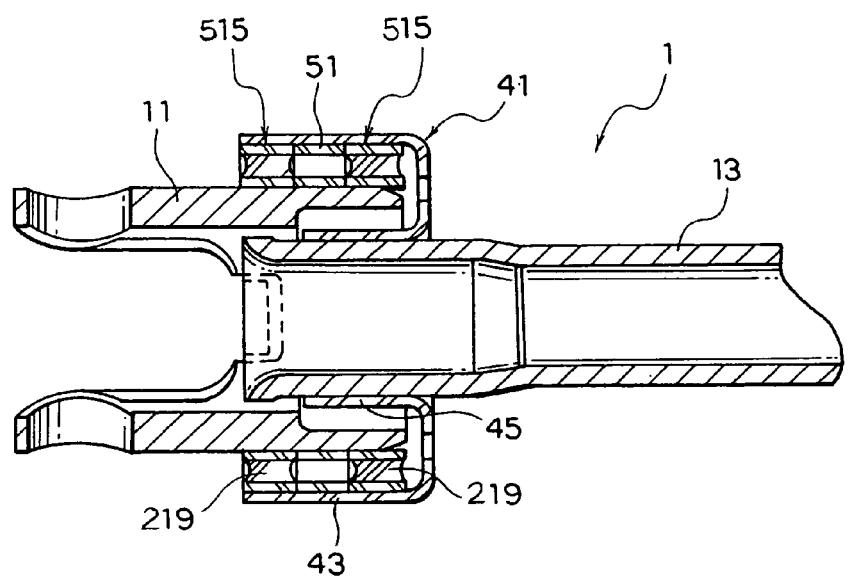
FIG. 14 is a vertical cross-sectional view of a yoke assembly according to a sixth embodiment.

FIG. 14 is a vertical cross-sectional view of a yoke assembly according to a sixth embodiment. In the yoke assembly of this embodiment, an elastic torque transmitting member 41 which is the same as in the fifth embodiment is utilized, but a pair of elastic bushes 515 are disposed before and after a spacer 51.

In the sixth embodiment, since this structure as employed, the diameter of the elastic members 219 is increased similarly to the first embodiment, and the elastic members 219 are lopsidedly disposed on both end sides in the axial direction. As a result, similarly to the fifth embodiment, while sufficient torsional rigidity between the yoke 11 and the shaft 13 is maintained, it is possible to effectively prevent the inclination of the yoke assembly 1 which causes deterioration of response of the steering system, and to reduce rigidity of the yoke assembly 1 in the axial direction which causes vibration and noise.

Figure 15:
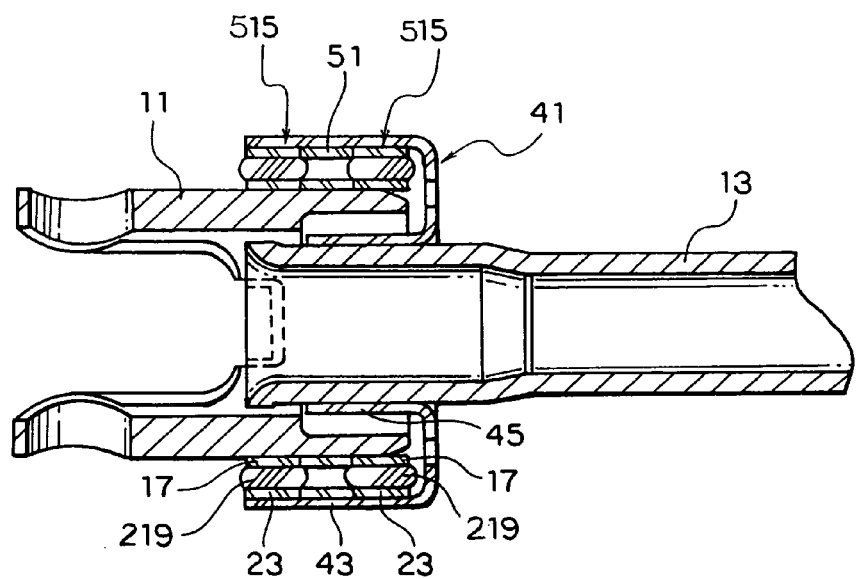
FIG. 15 is a vertical cross-sectional view showing a modification of the sixth embodiment.

FIG. 15 is a vertical cross-sectional view showing a modification of the sixth embodiment. In this embodiment, similarly to the modification of the fifth embodiment, after the elastic member 219 is fixed to the inner sleeve 17 and the outer sleeve 23 by means of vulcanized joining, the diameter of the inner sleeve 17 is increased, or the diameter of the outer sleeve 23 is reduced, and the operation and effect are the same as those in the modification of the fifth embodiment.

Figure 16:
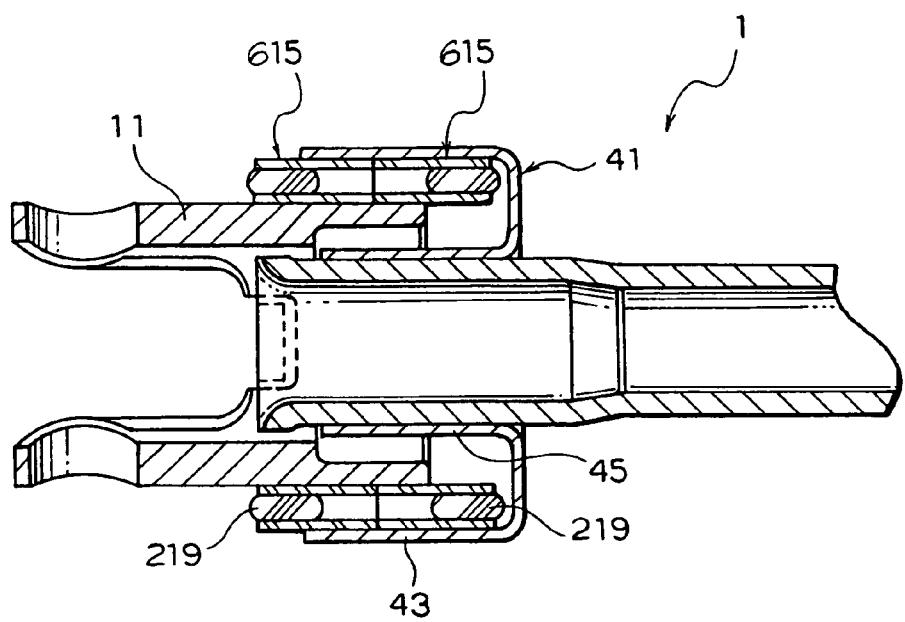
FIG. 16 is a vertical cross-sectional view of a yoke assembly according to a seventh embodiment.
Figure 17:
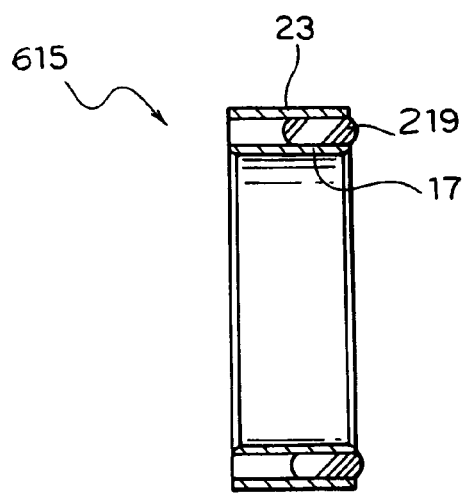
FIG. 17 is a vertical cross-sectional view of the elastic bush in FIG. 16.

FIG. 16 is a vertical cross-sectional view of a yoke assembly according the seventh embodiment. FIG. 17 is a vertical cross-sectional view of the elastic bush. In the yoke assembly of this embodiment, similarly to the sixth embodiment, a pair of elastic bushes 615 are used, but the elastic bushes 615 are in contact with each other without using a spacer. That is, in this embodiment, the elastic member 219 is disposed lopsidedly on the one end side of the elastic bush 615, and the identical elastic bushes 615 are forced upon so as to face each other between the yoke 11 and the outer ring 43 of the elastic torque transmitting member 41 such that the elastic members 19 are disposed respectively on both end sides in the axial direction. Further, the rear elastic bush 615 is projected beyond the rear end of the yoke 11. Also, the elastic bushes 615 are compressed beforehand similarly to the modification of the fifth embodiment.

The operation and effect of the seventh embodiment are approximately identical to those of the modification of the fifth embodiment, but the number of components and the number of manufacturing processes are reduced, so that the manufacturing cost is lowered. Also, since the distance between the elastic members 219 is taken adequately, the inclination of the yoke 11 and the shaft 13 is effectively prevented. In addition, the elastic bush 615 is projected beyond the end of the yoke 11, so that the entire length of the yoke 11 can be shortened to reduce its weight.

Figure 18:
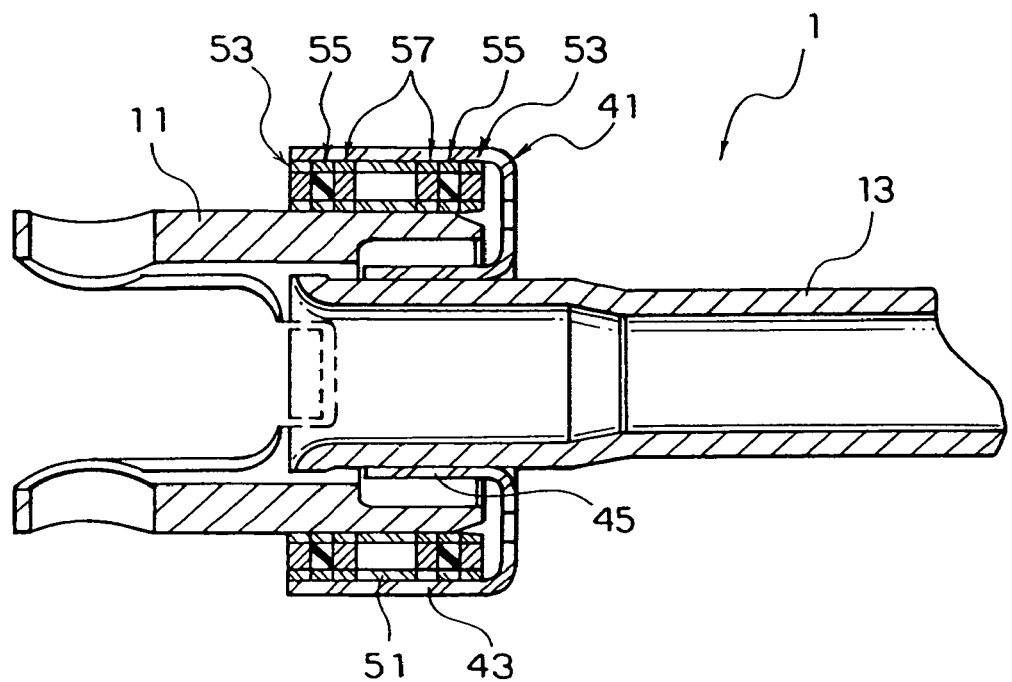
FIG. 18 is a vertical cross-sectional view of a yoke assembly according to an eighth embodiment.
Figure 19:
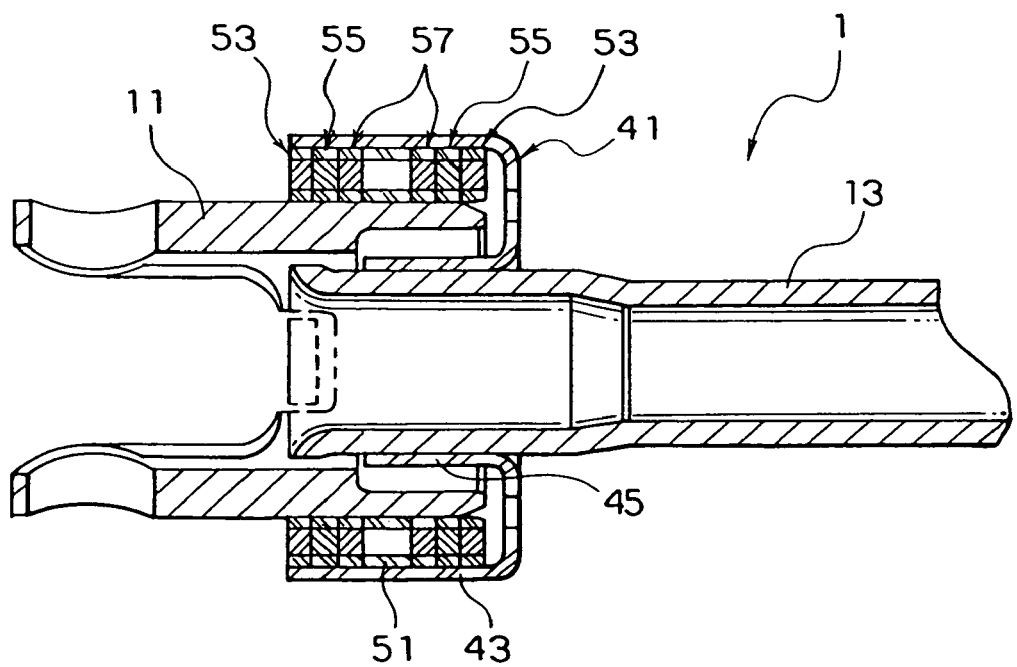
FIG. 19 is a vertical cross-sectional view showing a modification of the eighth embodiment.
Figure 20:
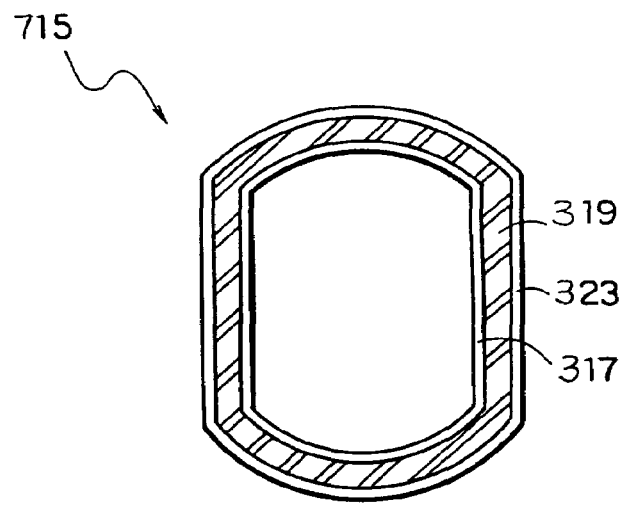
FIG. 20 is an elevation view of an elastic bush according to a ninth embodiment.
Figure 21:
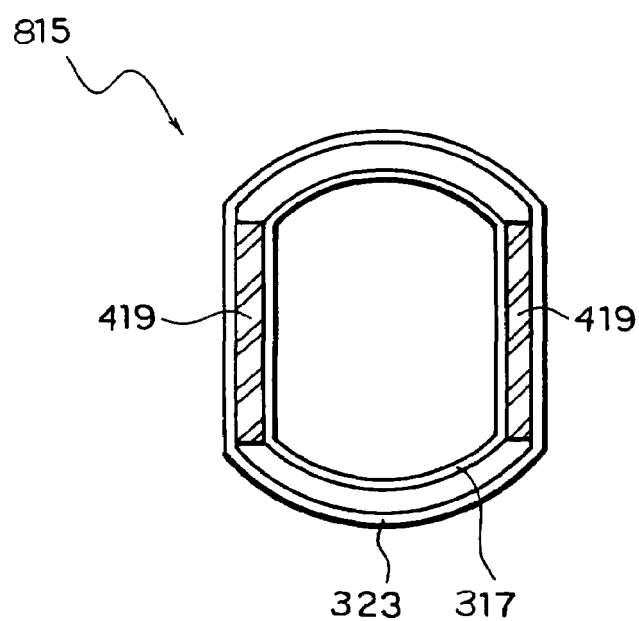
FIG. 21 is an elevation view of an elastic bush according to a tenth embodiment.
Figure 22:
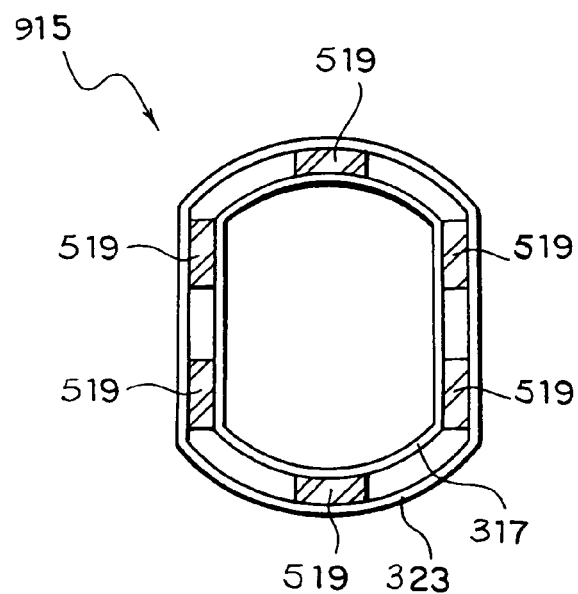
FIG. 22 is an elevation view of an elastic bush according to an 11th embodiment.
Figure 23:
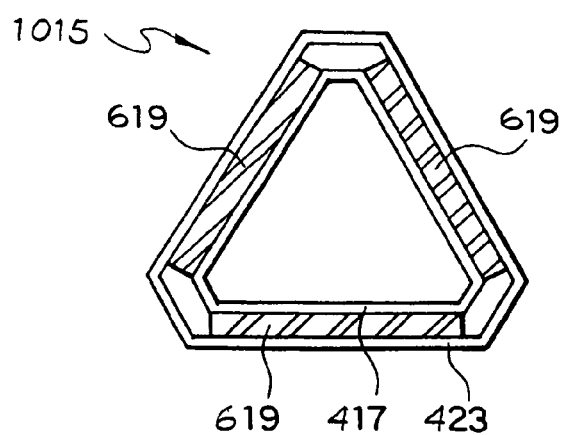
FIG. 23 is an elevation view of an elastic bush according to a 12th embodiment.

FIG. 18 is a vertical cross-sectional view of a yoke assembly according to an eighth embodiment. FIG. 19 is a vertical cross-sectional view of a modification of the eighth embodiment. The yoke assembly of the eighth embodiment has a structure approximately identical to that of the fifth embodiment, but sets of elastic bushes 53, 55 and 57 having different rigidity are provided. Before and after the spacer 51, the elastic bushes 53 with high rigidity are disposed on both end portions and the elastic bushes 57 with low rigidity are disposed on central portions.

As this structure is taken in the eighth embodiment, it is possible to prevent inclination of the yoke assembly 1 and to reduce rigidity thereof in the axial direction further as compared with the fifth embodiment. In the modification shown in FIG. 19, the elastic members of the elastic bushes 53, 55 and 57 are compressed in advance, whose operation and effect are the same as those of the modification of the fifth embodiment.

FIGS. 20 to 23 are elevation views of elastic bushes according to ninth to twelfth embodiments. In these embodiments, cross sections of all the elastic bushes 715, 815, 915, 1015 are of a noncircular shape. In the ninth to eleventh embodiments, the inner sleeve 317 and the outer sleeve 323 are oval shape, and the elastic members 319, 419, and 519 are properly disposed. That is, in the ninth embodiment, the elastic member 319 is disposed between the inner sleeve 317 and outer sleeve 323 without space. In the tenth embodiment, the elastic members 19 are disposed only between linear portions of the inner sleeve 317 and the outer sleeve 323. In the eleventh embodiment, six elastic members 519 are disposed at proper intervals between the inner sleeve 317 and the outer sleeve 323. On the other hand, in the twelfth embodiment, the inner sleeve 417 and the outer sleeve 423 are in the shape of a polygon (triangle), and three elastic members 619 are disposed between those excluding corner portions.

Thus, the shapes of the cross sections of the elastic bushes 715, 815, 915, 1015 in the ninth to twelfth embodiments are made noncircular, so that at the time of relative rotation of the inner sleeve (317,417) and the outer sleeve (323,423), a portion or most portions of the elastic members (319-619) are compressed and deformed. Thereby, it is possible to obtain the yoke assembly whose torsional rigidity is improved without increasing rigidity in the axial direction.

Figure 24:
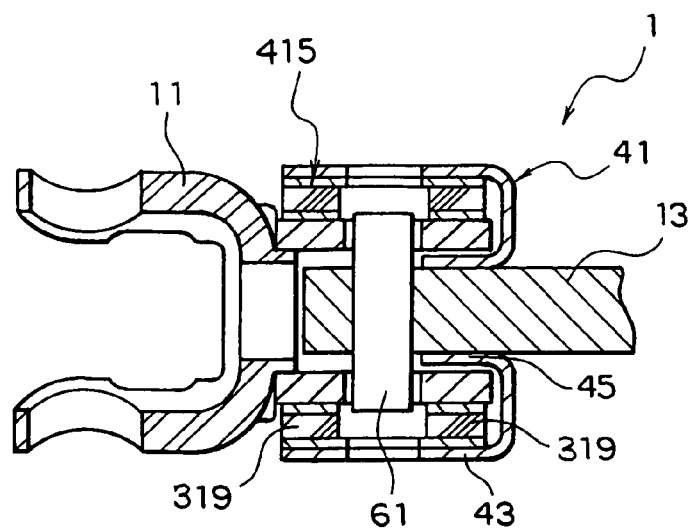
FIG. 24 is a vertical cross-sectional view of a yoke assembly according to a 13th embodiment.

FIG. 24 is a vertical cross-sectional view of a yoke assembly according to a thirteenth embodiment. In the thirteenth embodiment, the yoke assembly is constituted of the yoke 11, a solid shaft 13 and a large torque transmitting pin 61, but the structure of the elastic bush 415 is approximately identical to that of the fifth embodiment and so the operation and effect are the same also.

Figure 25:
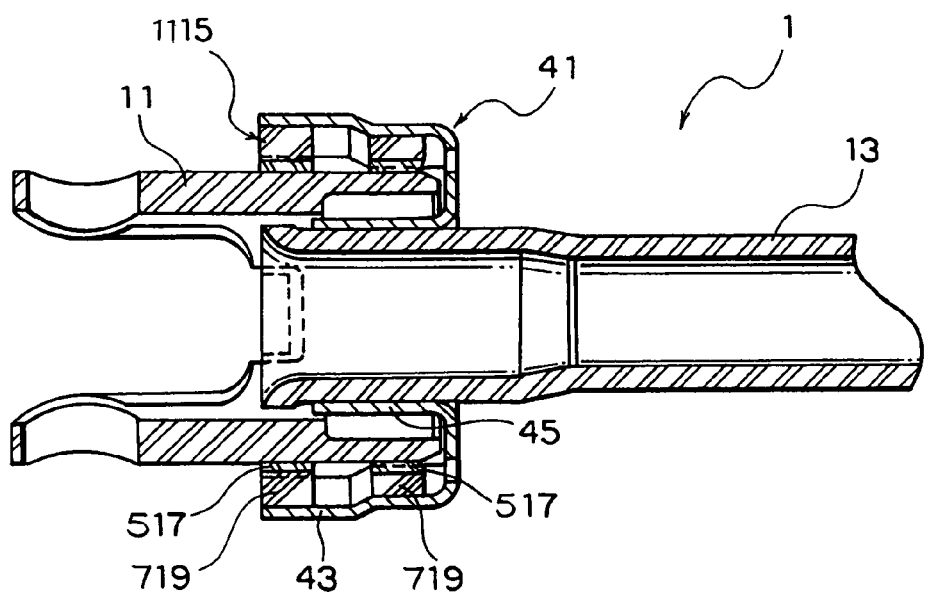
FIG. 25 is a vertical cross-sectional view of a yoke assembly according to a 14th embodiment.
Figure 26:
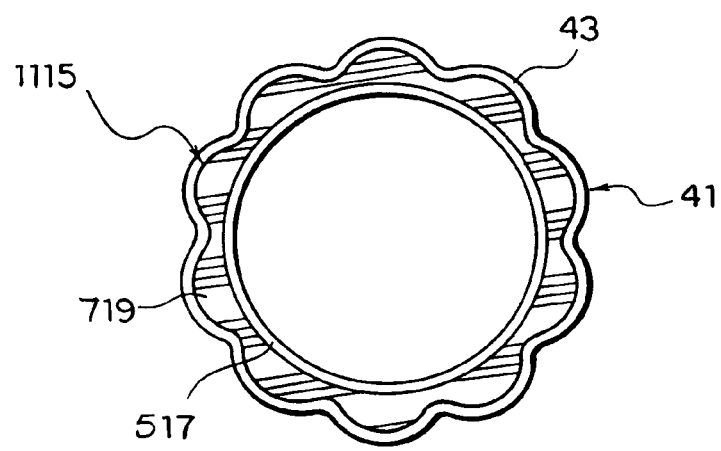
FIG. 26 is an elevation view of the elastic bush of the 14th embodiment.
Figure 27:
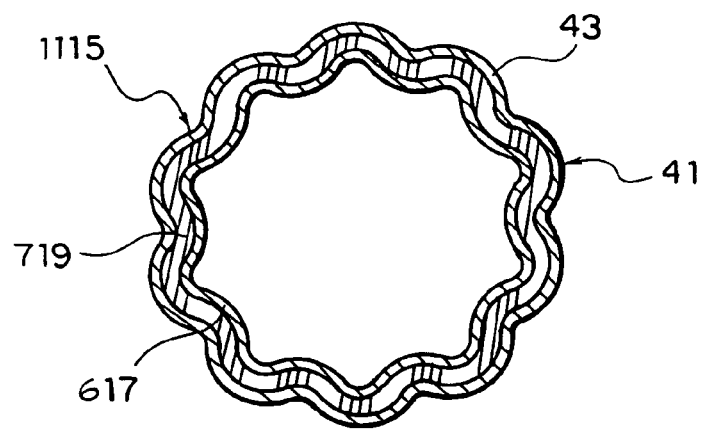
FIG. 27 is a horizontal cross-sectional view of an elastic bush according to a modification of the 14th embodiment.

FIG. 25 is a vertical cross-sectional view of a yoke assembly according to a fourteenth embodiment. FIG. 26 is an elevation view of the elastic bush thereof. FIG. 27 is a horizontal cross-sectional view showing an essential part of the elastic bush thereof. Although the structure of the fourteenth embodiment is approximately the same as that of the aforementioned fifth embodiment, the shape of the elastic torque transmitting member 41 and the structure and shape of the elastic bush 1115 are different. That is, in this embodiment, the outer ring 43 of the elastic torque transmitting member 41 has a plurality of irregularities and a wave-shaped cross section, and the outer surface of the elastic member 719 of the elastic bush 1115 has a shape corresponding to the shape of the outer ring 43. A portion of the inner sleeve 517 in the axial direction is formed to be a complete circle as shown in FIG. 26, and the remnant portion thereof is formed to have a wave-shaped cross section as shown in FIG. 27. In addition, the elastic bush 1115 does not have an outer sleeve, and the elastic member 719 is forced lightly upon the outer ring 43 of the elastic torque transmitting member 41. Also, the outer ring 43 of the elastic torque transmitting member 41 and the elastic member 719 are provided on center portions in the axial direction with steps to facilitate press fit.

In the fourteenth embodiment, thus, the horizontal cross sections of the outer ring 43 of the elastic torque transmitting member 41 as well as the elastic member 719 are made in the shape of wave, so at the time of relative rotation of the inner sleeve 517 and the outer ring 43, a portion of the elastic member 719 is compressed and deformed. Thereby, it is possible to obtain the yoke assembly capable of realizing both maintenance of the torsional rigidity and convenience of assembly without increasing rigidity in the axial direction.

FIG. 27 is a cross-sectional view of an elastic bush according to a modification of the fourteenth embodiment. In this modification, the cross section of the inner sleeve 617 is wave-shaped over the entire area in the axial direction correspondingly to the outer ring 43, contributing to further enhancement of torsional rigidity as compared with the fourteenth embodiment.

Figure 28:
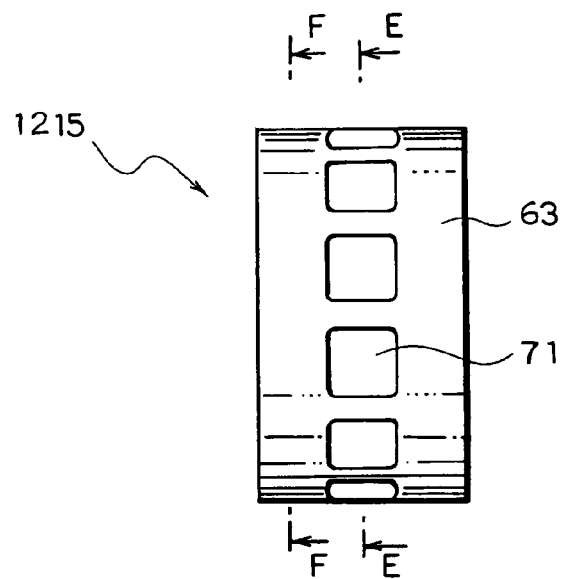
FIG. 28 is a side view of an elastic bush according to a 15th embodiment.
Figure 29:
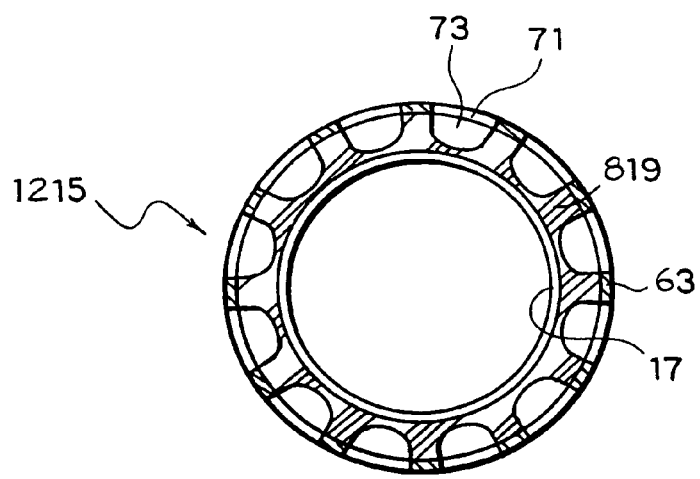
FIG. 29 is a cross-sectional view taken along line E-E in FIG. 28.
Figure 30:
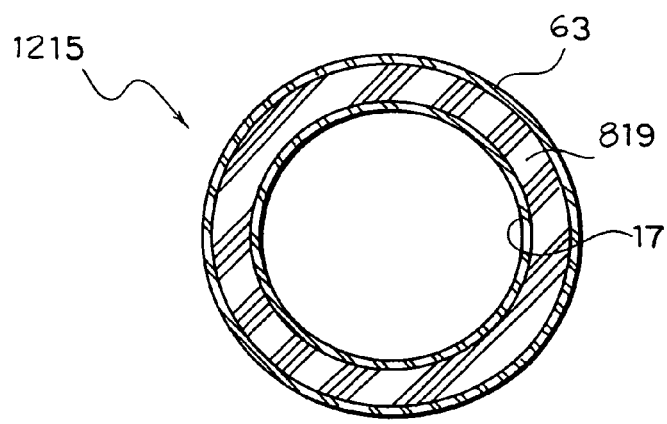
FIG. 30 is a cross-sectional view taken along line F-F in FIG. 28.

FIG. 28 is a side view of the elastic bush 1215 according to a fifteenth embodiment. FIG. 29 is a cross-sectional view taken along line E-E line in FIG. 28. FIG. 30 is a cross-sectional view taken along line F-F line in FIG. 28. As shown in FIGS. 28 to 30, in the elastic bush 1215 of the fifteenth embodiment, the outer sleeve 63 is provided on the center portions in the axial direction at intervals of a predetermined angle with rectangular holes 71, while the elastic member 819 is provided in positions corresponding to the holes 71 with recesses 73.

Owing to this structure of the fifteenth embodiment, at the time of vulcanized joining, it is possible to easily form the elastic bush 1215 with the elastic member 819 lopsidedly distributed so as to have large areas on both the end portions in the axial direction, and to obtain the identical operation and effect to those of the fifth embodiment.

Figure 31:
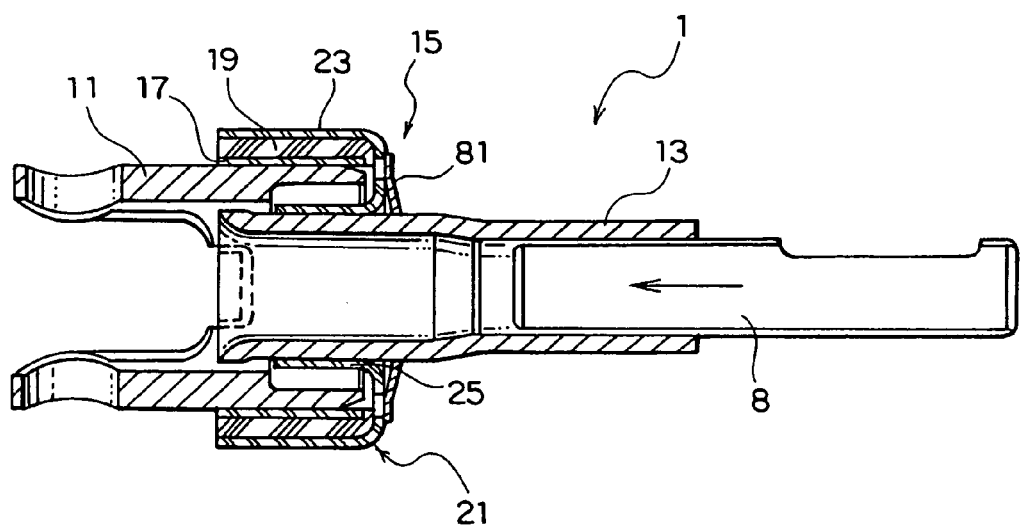
FIG. 31 is a vertical cross-sectional view of a yoke assembly according to a 16th embodiment.

FIG. 31 is a vertical cross-sectional view of a yoke assembly according to a sixteenth embodiment. Although the structure of the sixteenth embodiment is approximately the same as that of the first embodiment, a slipping-off preventing ring 81 is attached to the rear end surface of the housing 21. The slipping-off preventing ring 81 is a disc spring or the like, and is disposed with respect to the shaft 13 in a direction for inhibiting advance thereof. Therefore, at the time of a collision of an automobile, even though a driver bumps against a steering wheel to cause the first steering shaft 8 to enter into the shaft 13, and the shaft 13 is dragged by the first steering shaft 8 to advance, the slipping-off preventing ring 81 bites into the surface of the shaft 13 to inhibit advance of the shaft. As a result, separation of the yoke 11 and the shaft 13 is prevented and smooth collapse of the steering shaft is realized.

Figure 32:
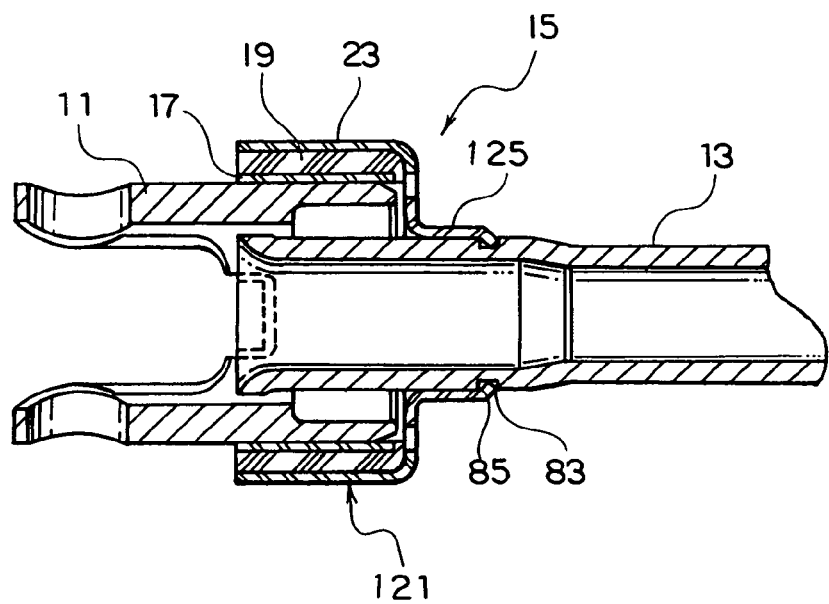
FIG. 32 is a vertical cross-sectional view of a yoke assembly according to a 17th embodiment.

FIG. 32 is a vertical cross-sectional view of a yoke assembly according to a seventeenth embodiment. The structure of the seventeenth embodiment is also approximately the same as that of the first embodiment, but the vertical cross section of the housing 121 is almost L-shaped, and the elastic torque transmitting ring 125 is formed so as to extend backward, and fitted and forced upon the shaft 13. The shaft 13 is provided in the vicinity of the rear end portion of the elastic torque transmitting ring 125 with an annular groove 83. The rear end portion of the elastic torque transmitting ring 125 is crimped, and its crimped portion 85 is fitted in the annular groove 83. Thereby, also in this embodiment, relative movement of the elastic torque transmitting ring 125 and the shaft 13 is limited, so that the operation and effect the same as in the sixteenth embodiment is obtainable.

Figure 33B:
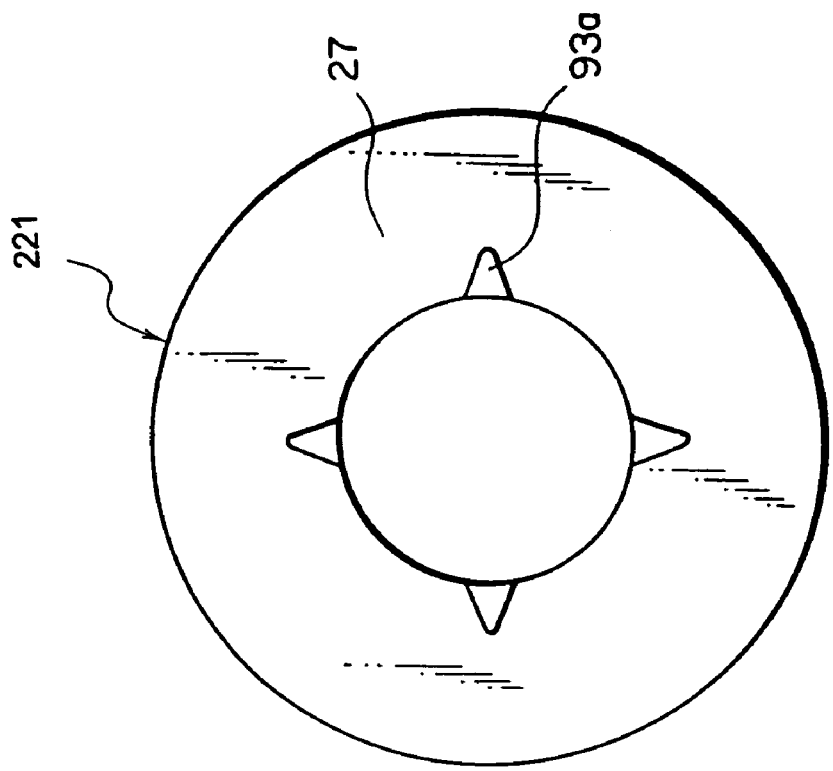
FIGS. 33A an 33B are, respectively, a vertical cross-sectional view and an elevation view of a housing according to an 18th embodiment.
Figure 33A:
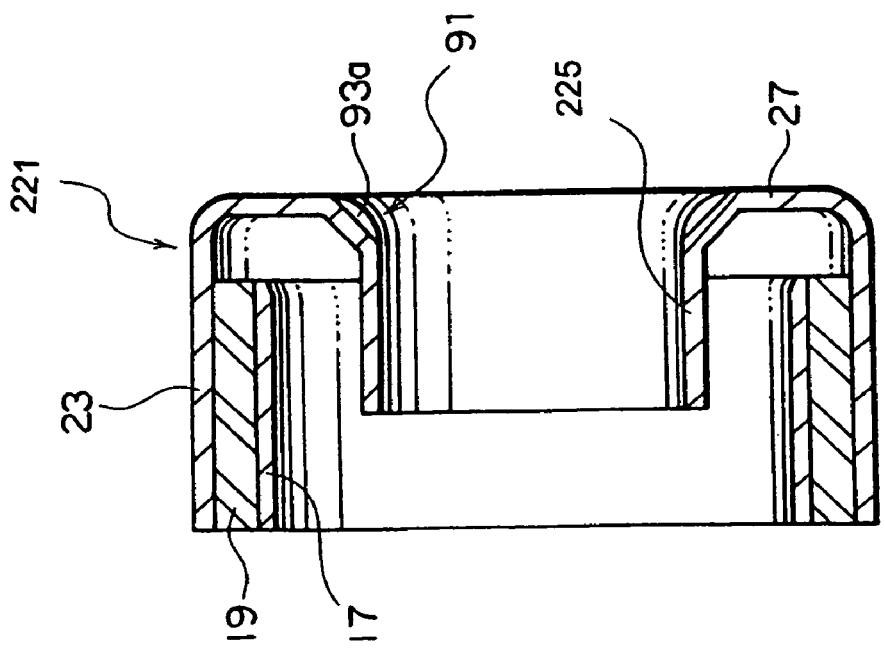

FIGS. 33A and 33B are, respectively, a vertical cross-sectional view and an elevation view of the housing 221 according to an eighteenth embodiment. Although the structure of the eighteenth embodiment is almost the same as that of the first embodiment, a plurality of ribs 93a are provided on an inner cylinder looped portion 91 of the disc-like web 27 connecting the outer sleeve 23 of the housing 221 and the elastic torque transmitting ring 225. Consequently, the rigidity of the disc-like web 27 is improved to make it difficult to be deformed, leading to enhancement of the strength of the housing 221. The volume and number of the ribs 93a may be adjusted properly in accordance with a desired strength. Also, in this embodiment, the same operation and effect as in the first embodiment can be obtained.

FIGS. 34A and 34B are, respectively, a vertical cross-sectional view and an elevation view of the housing 21 according to a nineteenth embodiment. Although the structure of the nineteenth embodiment is almost the same as that in the first embodiment, a plurality of beads 95 are provided on the disc portion of the disc-like web 27 connecting the outer sleeve 23 of the housing 21 and the elastic torque transmitting ring 25 so as to extend radially from the center of the housing 21. As a result, the rigidity of the disc-like web 27 is improved to make it difficult to be deformed, contributing to enhancement of the strength of the housing 21. Besides, the same operation and effect as in the first embodiment can be obtained.

The shapes (width, depth, shape of the cross section, etc.) of the beads 95 and a combination of the shapes may be selected properly in compliance with a desired design strength.

Figure 35B:
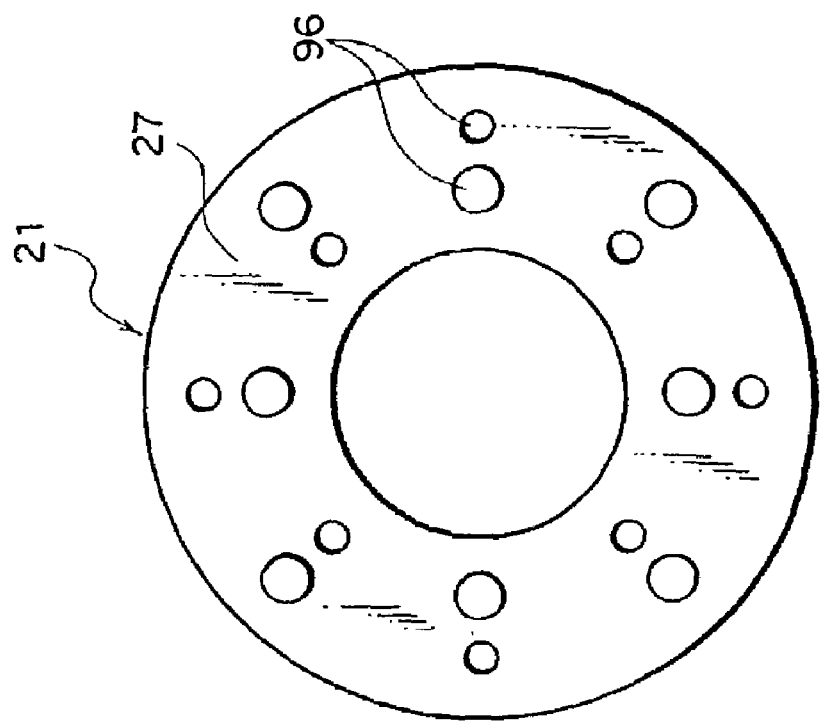
FIGS. 35A an 35B are, respectively, a vertical cross-sectional view and an elevation view of a housing according to a 20th embodiment.
Figure 35A:
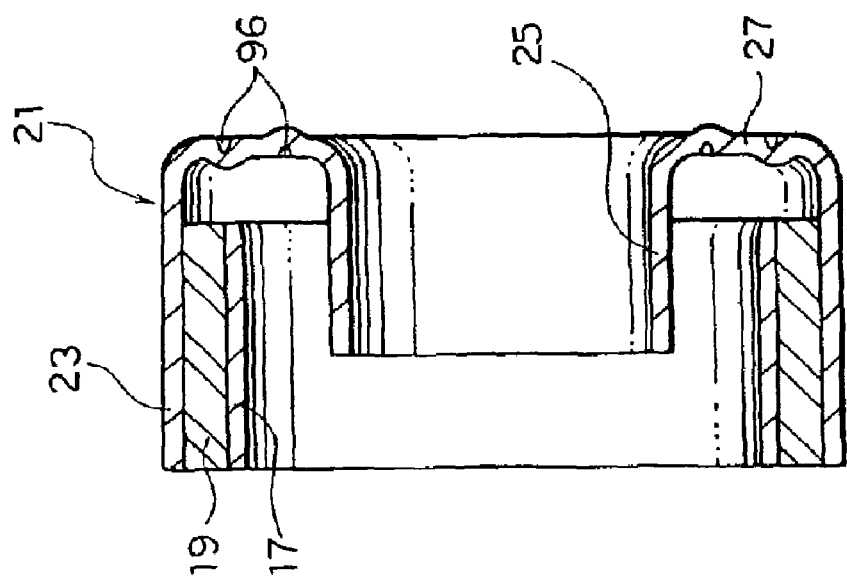

FIGS. 35A and 35B are, respectively, a vertical cross-sectional view and an elevation view of the housing 21 according to a twentieth embodiment. Although the structure of the twentieth embodiment is almost the same as that in the first embodiment, a plurality of dimples are provided on the disc portion of the disc-like web 27 connecting the outer sleeve 23 of the housing 21 and the elastic torque transmitting ring 25. As a result, the rigidity of the disc-like web 27 can be improved to make it difficult to be deformed, contributing to enhancement of the strength of the housing 21. Also, in this embodiment, the same operation and effect as in the first embodiment can be obtained. The shapes (diameter, depth, etc.) of the dimples 96, a combination of the shapes and the density of the dimples 96 may be selected in compliance with a desired design strength.

Figure 36:
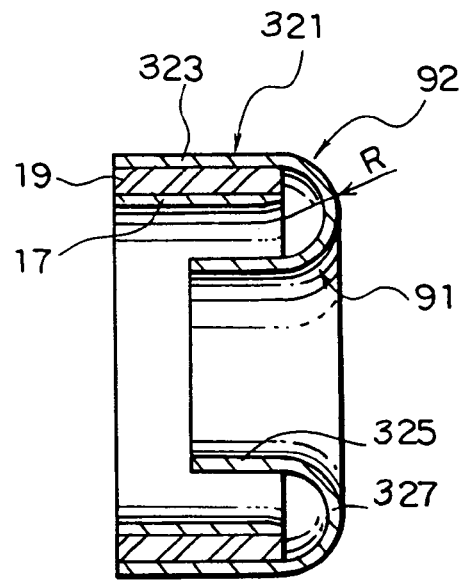
FIG. 36 is a vertical cross-sectional view of a housing according to a 21st embodiment.

FIG. 36 is a vertical cross-sectional view of the housing 321 according to a twenty-first embodiment. Although the structure of the twenty-first embodiment is almost the same as that in the first embodiment also, the disc portion of the disc-like web 327 connecting the outer sleeve 323 of the housing 321 and the elastic torque transmitting ring 325 is formed such that the bend raising or bend radius R of the inner cylinder looped portion 91 of the housing 321 and the bend raising or bend radius R of an outer cylinder looped portion 92 are continuous (i.e., the disc portion is formed in a semicircular cross-sectional shape). As a result, the rigidity of the disc-like web 327 is improved to make it difficult to be deformed, contributing to enhancement of the strength of the housing 321. Also in this embodiment, the same operation and effect as in the first embodiment can be obtained.

Figure 37:
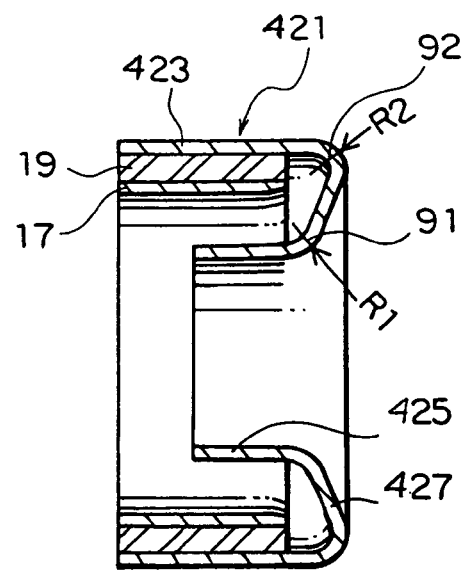
FIG. 37 is a vertical cross-sectional view of a housing according to a 22nd embodiment.

FIG. 37 is a vertical cross-sectional view of the housing 421 according to a twenty-second embodiment. Although the structure of the twenty-second embodiment is almost the same as that of the first embodiment, the disc portion of the disc-like web 427 connecting the outer sleeve 423 of the housing 421 and the elastic torque transmitting ring 425 is formed such that the bend raising or the bend radius R1 of the inner cylinder looped portion 91 of the housing 421 is defined with respect to the bend raising, or the bend radius R2 of the outer cylinder looped portion 92 so as to be R2<R1. As a result, the rigidity of the disc-like web 427 is improved to make it difficult to be deformed, contributing to enhancement of the strength of the housing 421. Also in this embodiment, the same operation and effect as in the first embodiment can be obtained.

The description of the embodiments according to the present invention is completed now, but the present invention is not limited thereto. For example, although the present invention is applied to the Cardan joint in the above embodiments, but may be applied to a double Cardan joint and a Birfield joint. Further, the structure and shape of the elastic bush, the material and detailed shape of the elastic member may be altered properly without deviating the scope of the purpose of the present invention.

As mentioned above, according to the elastic shaft joint of the present invention, while sufficient torsional rigidity between the joint member and the shaft member is secured, inclination of the elastic shaft joint causing deterioration of response of the steering system can be effectively prevented, and rigidity of the elastic shaft joint in the axial direction causing vibration and noise can be reduced.

What is claimed is:

1. An elastic shaft member comprising:

a joint member;

a shaft member being fitted in a shaft of said joint member;

an elastic bush having an inner sleeve fitted and fixed on said joint member, an elastic member fixed on an outside surface of said inner sleeve, and an outer sleeve fixed on an outside surface of said elastic member, for elastic torque transmission between said joint member and said shaft member; and a torque transmitting member having one end fitted and fixed on said elastic bush and another end fixed on said shaft member, wherein said elastic member is zigzag-shaped as viewed in a direction perpendicular to an axial direction thereof so as to have enlarged areas on both end sides in the axial direction between said inner sleeve and said outer sleeve.

2. An elastic shaft joint according to claim 1, wherein in said elastic bush, after said inner sleeve, said elastic member and said outer sleeve are all fixed, the diameter of said inner sleeve is increased or the diameter of said outer sleeve is decreased in order to subject said elastic member to compressive deformation.

* * * * *